United States Patent [19]

Hurley, Jr.

[11] 4,294,635

[45] Oct. 13, 1981

[54] PROCESS FOR MAKING GLAZED CERAMIC WARE

[76] Inventor: Donald C. Hurley, Jr., 183 St. Joseph Ave., Long Beach, Calif. 90803

[21] Appl. No.: 116,229

[22] Filed: Jan. 28, 1980

Related U.S. Application Data

[63] Continuation-in-part of Ser. No. 718,344, Aug. 27, 1976, Pat. No. 4,200,468.

[51] Int. Cl.$^3$ .............................................. C03C 5/02
[52] U.S. Cl. ........................................ 156/89; 501/20; 264/60; 264/62; 427/376.2
[58] Field of Search ................... 264/62, 60; 156/89; 106/48, 49

[56] References Cited

U.S. PATENT DOCUMENTS

| | | | |
|---|---|---|---|
| 602,227 | 4/1898 | Parvillee | 106/48 |
| 853,341 | 5/1907 | Buchner | 106/48 |
| 2,208,034 | 7/1940 | Korach et al. | 106/48 |
| 2,288,047 | 6/1942 | Sullivan et al. | 106/71 |
| 2,389,386 | 11/1945 | Russell | 106/48 |
| 2,871,132 | 1/1959 | Hummel | 106/45 |
| 3,230,283 | 1/1966 | Hughes | 106/48 |
| 3,506,473 | 4/1970 | Ettre | 156/89 |
| 3,898,091 | 8/1975 | Stout | 106/48 |

OTHER PUBLICATIONS

Lawrence, W. G., "Ceramic Science for the Potter", Chilton Book Company, 1972, pp. 44 and 82-91.

*Primary Examiner*—Caleb Weston
*Attorney, Agent, or Firm*—Poms, Smith, Lande & Rose

[57] ABSTRACT

A process for making glazed ceramic ware by applying plastic glaze-forming compositions onto the surface, of a clay body. The plastic composition may be molded or pressed on to a clay body. Additionally, the glaze-forming composition may be formed into a slurry by addition of water and applied to the clay body. The slurry may be directly applied to the clay body or indirectly applied using a porous body such as plaster of paris. The use of deflocculants is disclosed to minimize the amount of water necessary to form the slurry.

8 Claims, No Drawings

PROCESS FOR MAKING GLAZED CERAMIC WARE

This application is a continuation-in-part of my co-pending application on a "GLAZE-FORMING COMPOSITION AND METHOD", Ser. No. 718,344, filed Aug. 27, 1976 now U.S. Pat. No. 4,200,468.

BACKGROUND OF THE INVENTION

1. Field of the Invention

This invention relates to methods for applying glaze-forming compositions to ceramic ware. Particularly, glaze-forming compositions that are malleable, plastic, and/or castable, and more particularly, glaze-forming compositions that are moldable onto a plastic clay body and bondable with a plastic clay body and capable of being fired and matured together with the ceramic clay body to thereby produce a glazed ceramic ware in one firing.

2. Description of the Prior Art

In the past, glaze-forming compositions have, in general, been liquids which have been applied to the surface of bisque fired ceramic clay bodies by painting, dipping, or spraying, which would be followed by a second firing operation. A few glazing processes provide for the application of the glaze-forming liquid to an unfired ceramic clay body which is then fired, thereby maturing both the glaze-forming liquid and the green ceramic clay body.

These compositions and processes have proved unsatisfactory; in fact, the potter and ceramic manufacturer are greatly constricted in their artistry and means of glazing by the fluid state of the glaze liquid. Being a liquid, the glaze-forming compositions, heretofore, naturally have a tendency to run or drip down the surfaces of the ceramic bodies, thereby preventing sharp and distinct coloring on the finished ceramic. It was also difficult to apply more than one glaze-forming composition at a time to the ceramic clay without having the compositions run together.

In the light of the above limitations imposed upon potters by the liquid glaze-forming compositions, it has been a long desire to develop a glaze-forming composition that would be plastic and moldable by hand or machine to the surface of a ceramic clay body. My patent entitled "GLAZE-FORMING COMPOSITION AND METHOD" (U.S. Pat. No. 4,200,468) discloses such a desirable plastic and moldable glaze-forming composition. As discussed therein, a glaze-forming composition is disclosed for producing a matured glaze on a ceramic clay body wherein the composition is a plastic, malleable, coherent mass, maturable into a glaze on the surface of the ceramic body upon firing and bondable to an unfired clay body.

Since a plastic and moldable glaze-forming composition has now been developed, it is especially important and desirable that adequate methods be developed for applying these new compositions to unfired ceramic clay bodies.

SUMMARY OF THE INVENTION

Accordingly, it is an object of the present invention to disclose and provide a process for producing a highly decorative glaze ceramic ware by molding or pressing at least one plastic glaze-forming sheet onto the surface of an unfired clay body.

An additional object of the present invention is to disclose and provide a process for reducing the amount of water necessary to form a slip or slurry by adding a deflocculant to the glaze-forming composition.

Briefly, these and other objects of the invention are accomplished by applying a glaze-forming composition which is plastic, malleable, bondable to the surface of a plastic unfired ceramic clay body, and capable of being matured in one firing with the plastic unfired ceramic clay body. The plastic glaze-forming composition applied by the processes of the present invention is a modification of the conventional glaze-forming composition produced by increasing the clay content to provide the necessary plasticity; a minimum of 30% plastic clay being necessary and, in general, the amount of plastic clay in the glaze-forming composition will range from 30% to 50%, by weight.

One process of this invention provides for the application of the plastic glaze-forming composition to either a preshaped unfired ceramic clay body or to an unshaped mass of ceramic clay for subsequent shaping and firing at one temperature to mature both the ceramic clay body and the glaze-forming composition to thereby form a glazed ceramic composition.

Another process of the present invention allows for producing highly decorative clay bodies by forming an aqueous slip or slurry from the glaze-forming composition in varying colors. A deflocculant is added to minimize the amount of water necessary to form the slip. The slip or slurry is applied in varying colors to a non-porous surface (e.g. steel) and thereafter applying a porous surface (e.g. plaster of paris) to the decorative pattern on the non-porous surface to transfer said decorative pattern from the non-porous surface to the porous surface. Because the surface is porous, the water from the decorative pattern is drawn up into the plaster of paris body and thereafter a green ceramic clay body is applied to the surface of the porous body to transfer the decorative pattern from the porous body to the unfired clay body (e.g. tile) which thereafter is fired to form a fired glazed tile having a particularly attractive decorative surface which cannot be duplicated by the prior art methods.

DETAILED DESCRIPTION OF THE INVENTION

This invention provides a process for applying a glaze-forming composition that is plastic, malleable, bondable to the surface of an unfired ceramic clay body, and capable of being matured along with the ceramic clay body in one firing operation. Additionally, the present invention discloses a process for applying the glaze-forming composition by forming it into a slurry prior to application.

My co-pending application, as described above, discloses the plastic glaze-forming compositions to which the processes of the present invention are applied. My co-pending application is hereby incorporated by reference.

By plastic, it is meant that the composition has the property known as plasticity. Plasticity is that property of a material which allows it to retain its shape when no force is imparted to it, but will allow it to change its shape in response to a force applied to it. Clay, and particularly the clays used in making the glaze-forming compositions applied by the processes of the present invention, are plastic.

In general, glaze-forming compositions contain silica ($SiO_2$), alumina ($Al_2O_3$), and various fluxes (e.g. metal monoxides). In the instant invention, the molecular ratios of flux to alumina to silica will range from 1-0.10-1.15 to 1-1.05-9.2. The plastic glaze-forming composition can be used to as high as Cone 13 in which case, the molecular ratio would range from 1-1.1-7.1, but in general, it is preferred if the alumina content is not greater than 0.6 and the silica content is not greater than 4.5, that is to say, the molecular ratio would be 1-0.6-4.5.

As is known in the art, the term glaze indicates a thin coating on the surface of a clay body for the purpose of rendering the clay body impervious to moisture as well as providing a smooth, non-porous surface over the surface of the relatively rough, porous ceramic clay body.

As noted above, after firing, the plastic glazes are similar to those glazes found in the prior art, the primary difference being the fact that more decorative patterns can be produced by the glazes of the present invention. The various constituents of the glazes and their amounts set out molecularly have been indicated above. Such glazes can, in general, be formed by utilizing feldspar, a ball clay containing preferably less than 25% alumina, silica, and if necessary, flux. In this regard, it should be noted, that fluxes of the plastic glazes are those conventionally used in the making of glazes and include, in particular, $PbO$, $Na_2O$, $K_2O$, $CaO$, $MgO$, $BaO$, $Li_2O$, $SrO$, $SbO$, $B_2O_3$, and $ZnO$, among others. A principal function of the presence of these fluxes is to decrease the melting temperature of the silica in the glaze-forming composition.

In general, the amount of the various constituents, in order to produce the molecular ratios indicated above, can vary greatly and will include 30% to 50%, by weight, of clay with varying amounts of feldspar (e.g. from 5% to 20% in the case of a Cone 13 body) and the addition of some silica, depending upon the amount of feldspar and the amount of silica in the clay.

The ingredients of the above-described compositions are admixed in any conventional manner with between 25%-50% water by weight (dry ingr. wt.) to produce a plastic, malleable coherent mass or deflocculated casting slip that is bonded or caste directly or via a porous mold on to the surface of a plastic ceramic clay body. The amount of water which must be added to the dry glaze-forming composition to produce the desired plastic properties varies greatly depending upon the type of clay used and particle size.

According to one preferred process of the present invention the glaze-forming composition in its plastic state will be applied to the surface of a previously shaped unfired ceramic clay body. Because the unfired ceramic clay body is itself plastic and malleable, it is preferred that the glaze-forming composition be more malleable than the clay body so that the shape of the clay body is not destroyed during the application of the glaze-forming composition.

It is preferred that the glaze-forming composition be constituted so that it will properly mature in the same firing step as the green ceramic clay body, considering the firing conditions such as time and temperature. This can be conventionally accomplished by those skilled in the art.

The following is an example of the preparation of a glaze-forming composition and its application to a clay body according to this invention. First, a Cone 12 clay body is conventionally prepared from an admixture of 40 weight percent Kaolin, 20 weight percent Gairome clay, 12 weight percent China stone, 18 weight percent granite, and 10 weight percent Kira clay. Then a Cone 12 glaze body is prepared from an admixture containing 30 weight percent feldspar having an alumina content of 18 weight percent, 35 weight percent of Gairome clay having an alumina content of 38 weight percent, 25 weight percent silica, 8 weight percent lime, and 2 weight percent zinc oxide. This composition will have a flux to alumina to silica ratio of 1-1.13-7.07.

The resulting glaze-forming composition is mixed with sufficient water to form a plastic malleable coherent mass which is more malleable than the green ceramic clay body, is bondable to the ceramic clay body, and whose conditions for maturing are approximately equal to that of the green ceramic clay body.

As preferred by the present invention, the plastic glaze-forming composition is applied to the green ceramic clay body by first molding the ceramic clay body into its desired shape and pressing a sheet of said plastic glaze-forming composition onto at least one surface of the unfired clay body. Alternatively, the plastic glaze-forming composition may be applied to an unshaped ceramic clay body and then pressed thereon to form a shaped body, or the clay body may be placed into a mold and the glaze-forming composition placed on top and the resulting mixture shaped into the desired form. In any event, the unitary mass consisting of the green clay body with at least one layer thereon of the glaze-forming composition is fired and matured in one operation, resulting in a glazed ceramic ware.

The above-described process relates to application of the glaze-forming composition when it is in a plastic and malleable state. However, many times it is desirable to work with glazes in a slurry or slip form. Accordingly, the following description relates to processes for applying the glaze-forming composition when it is in a slurried condition.

If desired, a slurry can be formed by simply adding water to the glaze-forming composition until the desired viscosity is obtained. However, it is well known that because of the plastic behavior in clay/water systems, there is an inherent amount of shrinkage which occurs during drying. The amount of shrinkage relates to the clay particle size and the amount of water which is present in the slurry. Therefore, to maintain shrinkage upon drying to a minimum, it is desirable to form a slurry using a minimum amount of water. This is especially true for the glaze-forming compositions used in the present invention due to their high clay content.

The problems related to shrinkage of clay/water systems are well known in the art of slip casting. The common practice in slip casting is to minimize the amount of water necessary to form slips or slurries by adding small amounts of deflocculants.

In clay/water systems, it is well known that clay particles flocculate or aggregate to form a viscous material due to electrostatic attractions of the clay particles. It is equally well known that certain electrolytes when present in small amounts markedly affect the viscosity and flow properties of clay/water systems. Electrolytes which are added to disperse or deflocculate the clay/water system are commonly known as deflocculants. Common deflocculants include sodium silicate, sodium carbonate, barium carbonate, sodium oxalate or citrate, sodium pyrophosphates, sodium ligno sufonate, sodium bentonite and sodium carboxymethyl cellulose. Sodium silicate, sodium carbonate and barium carbonate are preferably used as deflocculants. The amount of water and deflocculating agent necessary to form a desired slurry is highly variable and may range anywhere from 25% to 55% water having a deflocculating agent content of between 0.01 and 1%. For example, an adequate slurry for use with the process of the present invention (to be described below) includes a cone 10 glaze-forming composition having the following dry weight ingredients (by weight): 35% ball clay, 35% silica, 20% calcium carbonate, 10% feldspar. To form the slurry, 40% by weight of a solution including water and 0.5% by weight sodium silicate as deflocculant is added to the dry glaze-forming composition.

An example of an adequate slurry using a cone 4 glaze-forming composition is a dry weight composition having the following ingredients by weight: 30% ball clay, 20% silica, 10% calcium carbonate, 10% talc, 5% zinc oxide and 25% pemco frit P-830 (14.9% sodium oxide, 7.2% calcium oxide, 21.6% boric oxide and 56.3% silica). Again, the slurry is formed by adding 40% by weight of a water solution having 0.5% by weight sodium silicate.

As will be recognized, depending on the particular clays, feldspars, silicas and fluxes to be used in the dry weight composition, the deflocculant and water proportions may need to be adjusted to achieve a slurry of the desired viscosity or flow characteristics. For example, colemanite (calcium borate) is a difficult flux to use due to its inherent deflocculating characteristics. Colemanite can very easily over deflocculate a slurried glaze without the use of any added deflocculant. If colmanite is required by a glaze recipe, it is preferred to substitute a frit containing boron to prevent over deflocculation.

In general, the glaze-forming composition slurry (having been prepared as described above) may be applied to a ceramic body in any number of ways.

In the preferred process for applying the glaze-forming slurry composition, a number of slips or slurries will be made, composed of numerous different colors if desired. These varied-colored slips will then be applied to a non-porous surface such as a flat steel plate, or thin plastic sheet so that a decorative pattern is produced thereon. Thereafter, a porous surface (for example, a plaster of paris body) is applied to the decorative pattern on the steel or plastic sheet and because the plaster of paris is porous, the decorative body will adhere to the plaster of paris body and be removed from the steel or plastic sheet. Due to the porosity of the plaster of paris, the water from the slurry decorative pattern is removed. Once the mold is glazed with the plastic and/or castable glaze, the mold may be used in slip casting, jiggering or wet rampressing to produce a decorative glazed surface on a ceramic body. The glazed ceramic body may be then fired in a normal manner in one firing. Such a process produces a decorative glaze surface not possible by prior art methods.

Alternatively, the slurry may be applied directly to the porous plaster of paris body without the initial step of first placing the slurry on a non-porous body. This can be accomplished by pouring, painting, dipping or spraying the slurry directly onto the plaster of paris body.

Finally, the slurry may be applied directly to the ceramic body if a flowing or free form pattern is desired.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein.

What is claimed is:

1. A process for making a glazed ceramic ware comprising the steps of:
   (a) mixing sufficient clay, feldspar, flux and water containing a deflocculant to form a slurry glaze-forming composition, said slurry composition consisting essentially of at least 30%, by weight, of clay, and where the molecular ratio of flux to alumina to silica in said slurry is from 1-0.1-1.15 to 1-1.05-9.2 and wherein said deflocculant is included with said water to minimize the amount of said water necessary to form said slurry;
   (b) applying the slurry onto the surface of an unfired clay body to form a decorative pattern;
   (c) firing the combined clay body and decorative pattern so that they are matured in one firing operation.

2. A process for making a glazed ceramic ware comprising the steps of:
   (a) mixing sufficient clay, feldspar, flux and water containing a deflocculant to form a slurry glaze-forming composition, said slurry composition consisting essentially of at least 30%, by weight, of clay, and where the molecular ratio of flux to alumina to silica in said slurry is from 1-0.1-1.15 to 1-1.05-9.2 and wherein said deflocculant is included with said water to minimize the amount of said water necessary to form said slurry;
   (b) placing the slurry on a porous surface in a decorative pattern;
   (c) allowing said decorative pattern to dry, applying the surface of a green clay ceramic body to said decorative pattern on said porous surface thereby transferring the decorative pattern to the surface of the green ceramic body;
   (d) firing the combined clay body and decorative pattern so that they are matured in one firing operation.

3. A process for making a glazed ceramic ware comprising the steps of:
   (a) mixing sufficient clay, feldspar, flux and water containing a deflocculant to form a slurry glaze-forming composition, said slurry composition consisting essentially of at least 30%, by weight, of clay, and where the molecular ratio of flux to alumina to silica in said slurry is from 1-0.1-1.15 to 1-1.05-9.2 and wherein said deflocculant is included with said water to minimize the amount of water necessary to form said slurry;
   (b) placing the slurry on a non-porous surface in a decorative pattern;
   (c) applying the surface of a porous body to the surface of the decorative pattern thereby transferring the decorative pattern to the surface of the porous body;
   (d) allowing said decorative pattern to dry, applying the surface of a green clay ceramic body to said decorative pattern on said porous surface thereby transferring the decorative pattern to the surface of the green ceramic body; and (e) firing the combined clay body and decorative pattern so that they are matured in one firing operation.

4. The process for making glazed ceramic ware according to claims 1, 2 or 3 wherein the deflocculant is present in said water in an amount between 0.01% and 1% by weight.

5. A process for making glazed ceramic ware according to claim 2 wherein various slurries of varying colors are applied to said non-porous body to produce a variously colored and highly decorative glazed ceramic body.

6. A process for making glazed ceramic ware according to claim 3 wherein said porous body is plaster of paris.

7. A process for making glazed ceramic ware according to claim 3 wherein said deflocculant is sodium silicate, calcium carbonate, or barium carbonate.

8. A process for making glazed ceramic ware according to claim 3 wherein various slurries of varying colors are applied to said non-porous body to produce a variously colored and highly decorative glazed ceramic body.

* * * * *